United States Patent
Lafferty

(10) Patent No.: US 9,744,934 B2
(45) Date of Patent: Aug. 29, 2017

(54) CONCENTRATOR STRAP FOR SEAT-MOUNTED AIRBAG

(71) Applicant: FAURECIA AUTOMOTIVE SEATING, LLC, Auburn Hills, MI (US)

(72) Inventor: Lola Lafferty, Capac, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 14/909,634

(22) PCT Filed: Jul. 31, 2014

(86) PCT No.: PCT/US2014/049196
§ 371 (c)(1),
(2) Date: Feb. 2, 2016

(87) PCT Pub. No.: WO2015/017674
PCT Pub. Date: Feb. 5, 2015

(65) Prior Publication Data
US 2016/0185313 A1 Jun. 30, 2016

Related U.S. Application Data

(60) Provisional application No. 61/861,496, filed on Aug. 2, 2013.

(51) Int. Cl.
*B60R 21/201* (2011.01)
*B60R 21/207* (2006.01)
(Continued)

(52) U.S. Cl.
CPC .......... *B60R 21/215* (2013.01); *B60R 21/201* (2013.01); *B60R 21/207* (2013.01);
(Continued)

(58) Field of Classification Search
CPC ... B60R 21/201; B60R 21/207; B60R 21/215; B60R 21/2165; B60R 21/216;
(Continued)

(56) References Cited

U.S. PATENT DOCUMENTS 5,810,389 A * 9/1998 Yamaji ............... B60R 21/207
280/728.3
5,860,673 A * 1/1999 Hasegawa ........... B60R 21/207
280/728.3
(Continued)

FOREIGN PATENT DOCUMENTS

JP 10086722 A 4/1998

OTHER PUBLICATIONS

International Search Report for application No. PCT/US2014/049196, dated Nov. 11, 2014, 3 pages.
(Continued)

*Primary Examiner* — Laura Freedman
(74) *Attorney, Agent, or Firm* — Reising Ethington P.C.

(57) ABSTRACT

A vehicle seat includes an airbag and a concentrator strap that facilitates simplified assembly and enhanced airbag performance. The concentrator strap includes an attachment feature that cooperates with a corresponding feature of the seat frame in a manner that reduces cost, cycle time, and assembly errors. The concentrator strap extends over the airbag module and into an attachment opening, where an attachment tab engages the seat frame. The concentrator strap can be pre-attached to a seat cover and extended to engage the seat frame after the seat cover is partially installed over the seat frame, as the attachment tab can be configured for engagement without the need for special tools.

20 Claims, 4 Drawing Sheets

(51) Int. Cl.
  *B60R 21/215* (2011.01)
  *B60R 21/216* (2011.01)
  *B60R 21/2165* (2011.01)
  *B60N 2/58* (2006.01)
  *B60R 21/00* (2006.01)
(52) U.S. Cl.
  CPC .. *B60R 21/2165* (2013.01); *B60N 2002/5808* (2013.01); *B60R 2021/0032* (2013.01); *B60R 2021/21506* (2013.01); *B60R 2021/21537* (2013.01)
(58) Field of Classification Search
  CPC .... B60R 2021/161; B60R 2021/21506; B60R 2021/21531; B60R 2021/21537; B60N 2002/5808
  See application file for complete search history.

(56) References Cited

U.S. PATENT DOCUMENTS

| | | | |
|---|---|---|---|
| 5,967,603 A | 10/1999 | Genders et al. | |
| 6,045,151 A | 4/2000 | Wu | |
| 6,439,597 B1* | 8/2002 | Harada | B60R 21/207 280/728.2 |
| 7,322,595 B2* | 1/2008 | Wallentin | B60R 21/2171 280/728.2 |
| 7,341,275 B2* | 3/2008 | Miyake | B60R 21/207 280/730.2 |
| 7,393,005 B2* | 7/2008 | Inazu | B60N 2/5825 280/728.2 |
| 7,621,557 B2* | 11/2009 | Tracht | B60R 21/207 280/728.2 |
| 7,677,594 B2* | 3/2010 | Hazlewood | B60N 2/5883 280/728.2 |
| 7,681,910 B2* | 3/2010 | Wieczorek | B60R 21/207 280/728.2 |
| 7,971,900 B2* | 7/2011 | Lim | B60R 21/207 280/730.2 |
| 8,328,231 B2* | 12/2012 | Nakamura | B60R 21/2176 280/728.2 |
| 8,474,858 B2* | 7/2013 | Urabe | B60R 21/207 280/728.2 |
| 9,067,559 B2* | 6/2015 | Nii | B60R 21/207 |
| 9,393,893 B2* | 7/2016 | Kozaki | B60N 2/58 |
| 2008/0100044 A1 | 5/2008 | Cho | |
| 2012/0248748 A1 | 10/2012 | Ciszek | |
| 2015/0336528 A1* | 11/2015 | Tanabe | B60R 21/207 280/728.2 |
| 2015/0367803 A1* | 12/2015 | Fujiwara | B60R 21/207 280/728.2 |

OTHER PUBLICATIONS

Written Opinion for application No. PCT/US2014/049196, dated Nov. 11, 2014, 8 pages.

* cited by examiner

CONCENTRATOR STRAP FOR SEAT-MOUNTED AIRBAG

TECHNICAL FIELD

The invention relates generally to vehicle airbags and vehicle interior trim coverings for airbags and, more particularly, to incorporating airbags into vehicle seats.

BACKGROUND

Vehicle seats equipped with airbags are typically configured so that the airbag deploys from beneath a seat cover at a predictable location, such as at a tear seam formed in the seat cover. The airbag may be located near relatively pliable materials, such as a compressible foam cushion material and/or a high-elongation polymer-based seat cover material. These types of materials can absorb some of the airbag inflation energy in the initial stages of airbag deployment and impair the function of the tear seam if the inflation energy is not properly managed. For example, the foam cushion may compress or the seat cover may stretch so that seat cover tearing is delayed or prevented. High tensile strength materials, sometimes referred to as concentrator materials, can be included on or around the airbag to help direct the inflation energy to the desired tearing location.

SUMMARY

In accordance with one or more embodiments of the invention there is provided a vehicle seat that includes a seat frame, a seat cover disposed over the seat frame, an airbag module, and a concentrator strap extending between the airbag module and the seat cover. The seat frame includes a frame member having an inner side, an opposite outer side, and an attachment opening extending between the inner side and the outer side. The airbag module includes an inflatable airbag located between the seat frame and the seat cover. The concentrator strap has an end that extends into the attachment opening and an attachment tab at said end that engages the inner side of the frame member at the attachment opening.

In some embodiments, the seat cover includes a tear seam, and the concentrator strap has a second end attached to the seat cover at the tear seam.

The concentrator strap may include a layer of concentrator material coupled with the attachment tab at a hinge joint. The layer of concentrator material and the attachment tab may be sewn together to form a hinge joint. And in some embodiments, the layer of concentrator material is in tension.

In some embodiments, the attachment tab includes a face that engages the inner side of the frame member, and a hinge joint is located along the face of the attachment tab.

The attachment opening may be a fully enclosed slot. In some embodiments, each of the attachment opening and the attachment tab has a width measured in the same direction, and the width of the attachment tab is greater than the width of the attachment opening.

In some embodiments, the frame member includes a shoulder at least partially circumscribing the attachment opening at the inner side, and the attachment tab engages the shoulder.

The frame member may include at least one tab locator extending from and arranged along the inner side of the frame member to restrict movement of the attachment tab in a widthwise direction.

In some embodiments, a foam cushion is located between the seat frame and the seat cover, and the concentrator strap extends along or through the foam cushion. In other embodiments, a foam cushion is located between the seat frame and the seat cover, and the concentrator strap does not extend along or through the foam cushion.

In some embodiments, a foam cushion at least partially surrounding the airbag module is located between the seat frame and the seat cover, and the concentrator strap extends between the airbag module and the foam cushion.

In some embodiments, the frame member is a seat back frame member.

In accordance with one or more other embodiments of the invention there is provided a method of making the vehicle seat, including the steps of: (a) attaching an airbag module to a seat frame; (b) extending a concentrator strap having an attachment tab over the airbag module and into an attachment opening of a frame member of the seat frame so that the attachment tab engages an inner side of the frame member; and (c) disposing a seat cover over the seat frame and over the airbag module. In some embodiments, step (a) is performed before steps (b) and (c), and in other embodiments it is not.

The seat cover may be an envelope cover.

In some embodiments, the concentrator strap is attached to the seat cover during steps (b) and (c).

The frame member may be a seat back frame member, and steps (b) and (c) together may include the steps of: (i) covering a top portion of the seat frame with the seat cover, leaving a bottom portion of the seat frame uncovered by the seat cover; (ii) subsequently extending the concentrator strap over the airbag module and into the attachment opening of the frame member so that the attachment tab engages the inner side of the frame member; and (iii) subsequently covering the bottom portion of the seat back frame with the seat cover.

In some embodiments, step (b) includes the steps of: guiding the attachment tab through the attachment opening from an outer side of the frame member to the inner side of the frame member, and reorienting the attachment tab at the inner side of the frame member.

It is contemplated that the various features set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

Illustrative embodiments will hereinafter be described in conjunction with the appended drawings, wherein.

DETAILED DESCRIPTION

The vehicle seat described herein includes an airbag and a concentrator strap that facilitates simplified assembly and enhanced airbag performance. The concentrator strap includes an attachment feature that cooperates with a corresponding feature on the seat frame or other seat component and may eliminate the need for threaded fasteners, complex weldments or brackets, custom clip assemblies, and/or other features that add cost, assembly time, and the opportunity for mistakes in the seat manufacturing process.

Figure 1:
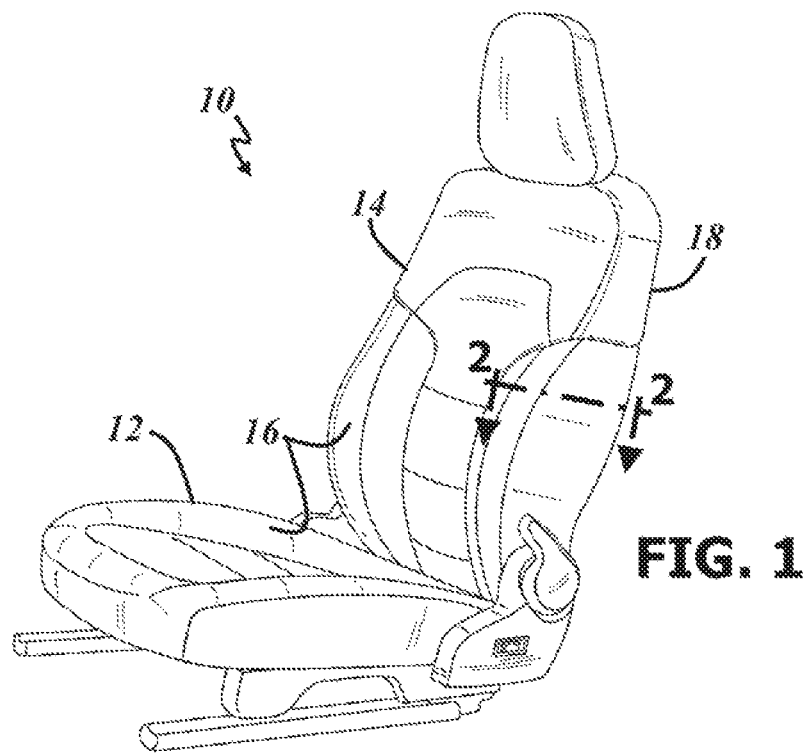
FIG. 1 is a perspective view of a vehicle seat that may be equipped with an airbag module and a concentrator strap as described herein.

FIG. 1 is a perspective view of an illustrative seat 10, e.g., a vehicle seat 10, including a seat bottom 12 and a seat back 14 coupled with and extending from the seat bottom. Each of the seat bottom 12 and seat back 14 includes a seat cover 16, also called trimming 16, disposed over and secured to an underlying seat frame 20. Each of the seat bottom 12 and seat back 14 may include a comfort element, such as a foam cushion or other deformable component, between the seat cover 16 and the seat frame 20. Portions of exemplary seat frames and comfort elements are illustrated in subsequent figures.

Figure 2:
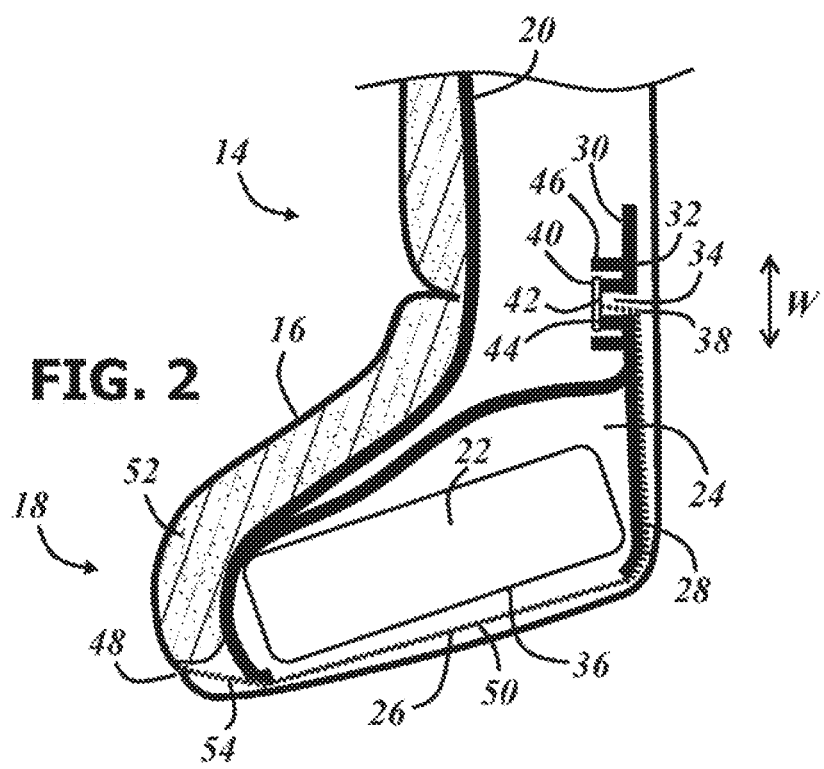
FIG. 2 is a cross-sectional view of an outboard side of a seat back of the vehicle seat of FIG. 1, illustrating one configuration of the airbag module and the concentrator strap.

FIG. 2 is a cross-sectional view of an outboard side 18 of the seat back 14 of FIG. 1 and depicts a portion of the seat frame 20 (e.g., the seat back frame 20), an airbag module 22 located within a space 24 between the seat frame 20 and the seat cover 16, and a concentrator strap 26 extending between the airbag module 22 and the seat cover 16. The seat frame 20 includes one or more frame members 28 that are interconnected and configured to provide the basic load-bearing structure for the seat 10, e.g. the seat back 14. For example, the seat frame 20 may include a pair of frame members 28 (e.g., a pair of inboard and outboard frame members) and a pair of transverse frame members connecting the frame members 28 in a generally rectangular configuration, as well as other frame members. The seat frame 20 and any of the frame members 28 may be constructed from any suitable material, such as metal (e.g., steel) or a structural composite material (e.g. a glass-reinforced polymer material).

More than one frame member 28 may be formed together from a single piece of material. For example, a vertical frame member and a transverse frame member of the seat back 14 and/or other frame members may be molded together from a composite material or formed from a single metal stamping or piece of metal tubing.

Each frame member 28 has an inner side 30 and an opposite outer side 32, with the inner side 30 facing toward the interior of the seat and the outer side 32 facing away from the interior of the seat. The inner and outer sides 30, 32 are not necessarily flat and may included contours, such as molded or stamped contours or contours of tubular frame members.

As shown in FIG. 2, at least one frame member 28 includes an attachment opening 34 extending between the inner side 30 and the outer side 32 of the frame member 28 for receiving and securing the concentrator strap 26 to the seat frame 20.

The airbag module 22 can be of any known type and generally includes an inflatable airbag and an inflator (not shown) that is actuated during a vehicle collision to inflate the airbag. The airbag module 22 may also include a housing 36, which can be a hard-shell housing (e.g., an injection molded clam shell) or a softpack housing (e.g., a textile sheath). The inflatable airbag, and optionally the inflator, is stored in the housing 36.

In the illustrative example, the seat frame 20 and the concentrator strap 26 partly defines a space 24 in which the airbag module 22 is located. The airbag module 22 may be attached to the seat frame 20, or to some other vehicle seat component, by any suitable means (e.g. fasteners). The airbag module 22 may be attached to the same frame member 28 that includes the attachment opening 34, or to a different frame member 28. In some embodiments, the concentrator strap 26 may at least partly secure the airbag module 22 to the seat frame 20.

The illustrated concentrator strap 26 has a first end 38 that extends into the attachment opening 34 and an attachment tab 40 at the end of the concentrator strap 26 that engages the inner side 30 of the frame member 28. This arrangement allows the concentrator strap 26 to be placed in tension or at least with minimal or no slack, which can improve airbag deployment, as described in further detail below.

In this particular example, the attachment tab 40 is generally flat and has a face 42 engaged with a shoulder 44 formed along the inner side 30 of the frame member 28 and at least partially circumscribing the attachment opening 34.

The attachment tab 40 and the attachment opening 34 each have a width measured in the same direction (W). The width of the attachment tab 40 is greater than the width of the attachment opening 34.

The frame member 28 may also include tab locators 46 arranged along the inner side 30 of the frame member 28, as shown in FIG. 2, to restrict movement of the attachment tab 40 so that the attachment tab 40 cannot inadvertently pass through the attachment opening 34 to the outer side 32 of the frame member 28 and detach the concentrator strap 26 from the frame member 28. The locators 46 may also serve as positive locating features.

The concentrator strap 26 is provided to help direct airbag inflation energy toward a tear seam 48 formed in the seat cover 16. In one embodiment, the tear seam 48 is a stitched seam joining together two portions of material of the seat cover 16 with low tensile strength thread. But the tear seam 48 can be otherwise configured to allow the seat cover 16 to split so that the airbag deploys at the desired location.

The concentrator strap 26 includes one or more layers of a concentrator material 50, which is a material having a relatively high tensile strength compared to the materials at the tear seam 48, and a relatively low elongation compared to the material of the seat cover 16. The concentrator material 50 functions by confining the inflatable airbag in the initial stages of inflation to prevent the inflatable airbag from contacting and/or deforming more pliable seat components, such as foam cushion 52 or the seat cover 16, particularly made of polymer-based materials.

This helps prevent loss of airbag inflation energy, which would otherwise delay tearing of the seat cover 16 at the tear seam 48, if the seat cover was allowed to stretch, for instance.

The layer(s) of concentrator material 50 is preferably a thin layer of stretch-resistant fabric (e.g. woven nylon) that is sufficiently flexible to conform to the seat components along which it is located.

A second end 54 of the concentrator strap 26, opposite to the first end 38, is attached to the seat cover 16 at the tear seam 48 in the example of FIG. 2. The concentrator strap 26 may be sewn to the selvage material or free edges of the seat cover 16 at the tear seam 48, for example. The second end 54 of the concentrator strap 26 could be attached to some other seat component instead. For example, the frame member 28 may include another attachment opening for receiving another attachment tab at the second end 54 of the concentrator strap 26, and/or the concentrator strap 26 may include its own tear seam or weakened area located near the tear seam 48 of the seat cover 16.

The illustrated concentrator strap 26 is configured so that is does not extend along the foam cushion 52. This may be preferable to configurations where the concentrator strap 26 extends along an outside surface of a foam cushion 52 and/or through an opening in the foam cushion, as the airbag inflation energy may be lost by foam compression, thus retarding the airbag deployment. Extending the concentrator strap 26 beneath the foam cushion 52, between the seat frame 20 and the foam cushion 52, requires additional effort during assembly as well.

Figure 3:
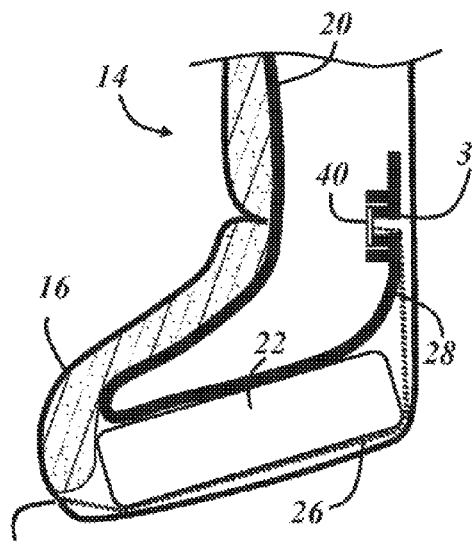
FIG. 3 is a cross-sectional view of the outboard side of a different seat back, illustrating another configuration of the airbag module and the concentrator strap.

In the example of FIG. 2, the concentrator strap 26 is taut or in tension, but it is spaced apart from the airbag module 22. In another embodiment, illustrated by way of example in FIG. 3, the concentrator strap 26 extends along and is in contact with the airbag module 22. In the configuration of FIG. 3, the time delay for the airbag inflation energy to be directed toward the tear seam 48 may be minimized for shorter deployment times.

Figure 4:
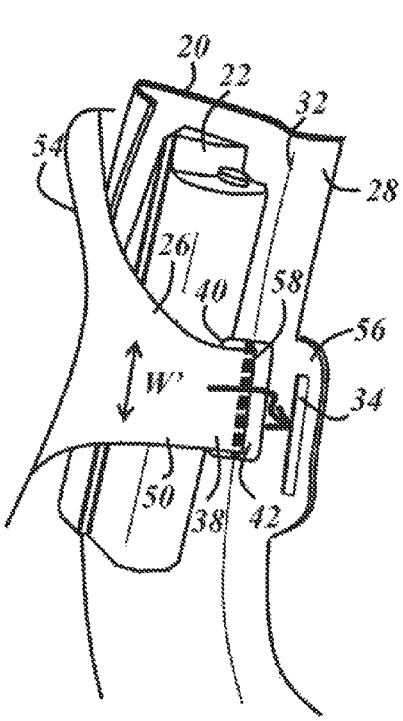
FIG. 4 is a perspective view of an exemplary frame member with the airbag module attached and the concentrator strap ready to be received by an attachment opening of the frame member.

FIG. 4 is a perspective view of the frame member 28 of the seat frame 20 with an attached airbag module 22 and an embodiment of the concentrator strap 26 extending over the airbag module 22 to be received by the attachment opening 34 of the seat frame 20. The illustrated example of the attachment opening 34 is a slot or elongated opening. The illustrated attachment opening 34 is a full slot, meaning that it is fully surrounded by the material of the seat frame 20.

Partial slots or openings are also possible. In this example, a slotted portion 56 of the frame member 28 includes the attachment opening 34 and is formed integrally with the material of the frame member 28, preferably from the same piece of material.

In some other embodiments, the slotted portion 56 is a separately formed or assembled piece that is attached to the frame member 28. For example, where the frame member 28 is formed from metal, certain features (e.g., shoulder 44 or locators 46 of FIG. 2) may be difficult or costly to form integrally, and a molded plastic slotted portion 56 that includes the attachment opening 34 and/or other features can be provided and attached to the frame member 28 at the desired attachment location of the concentrator strap 26.

The depicted concentrator strap 26 has a width (W') at the first end 38 that is less than a width at the second end 54. The narrowest portion of the concentrator strap 26 may be at the first end 38 where the attachment tab 40 is attached to the concentrator material 50 such that the layer of concentrator material 50 is tapered to cover a larger portion of the airbag module 22 than if the concentrator material 50 was only as wide as its narrowest portion.

In this embodiment, the concentrator strap 26 has a hinge joint 58 formed at the face 42 of the attachment tab 40 where the concentrator material 50 is coupled with the attachment tab 40. In this particular example, the attachment tab 40 and the concentrator material 50 are sewn together to form the hinge joint 58. In one embodiment, the attachment tab 40 is made from an unfilled thermoplastic material having a thickness sufficiently small (e.g., about 1 mm) for an industrial sewing needle to pass through the attachment tab 40 so that the concentrator material 50 and the attachment tab 40 can be sewn together.

In other embodiments, the concentrator material 50 and the attachment tab 40 are adhesively attached or otherwise bonded together at the hinge joint 58. In another example, the attachment tab 40 includes one or more openings, such as slots, formed through the thickness of the attachment tab 40 with the layer of concentrator material 50 routed through the opening(s) of the attachment tab and folded back to be sewn or otherwise attached to itself to form the hinge joint 58. Other types of hinge joints 58 are possible, such as hinge joints 58 with more than one rotational degree of freedom. These types of hinge joints 58, along with the illustrated hinge joint 58, allow the attachment tab to be reoriented during and/or after the attachment tab 40 passes through the attachment opening 34 during assembly.

Figure 5A:
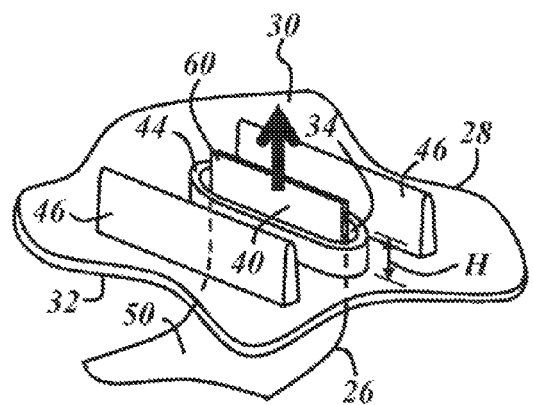
FIGS. 5(a)-5(c) illustrate an embodiment of the concentrator strap being guided through the attachment opening to engage an inner side of the frame member.
Figure 5B:
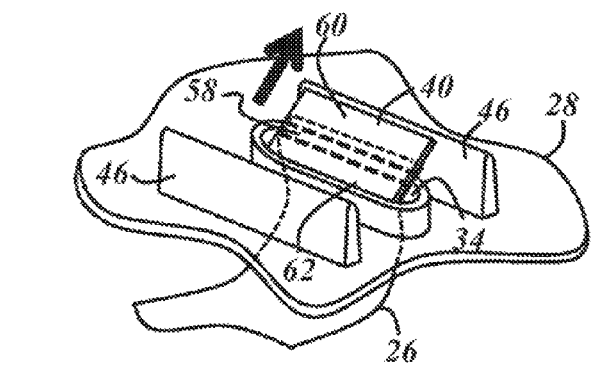
Figure 5C:
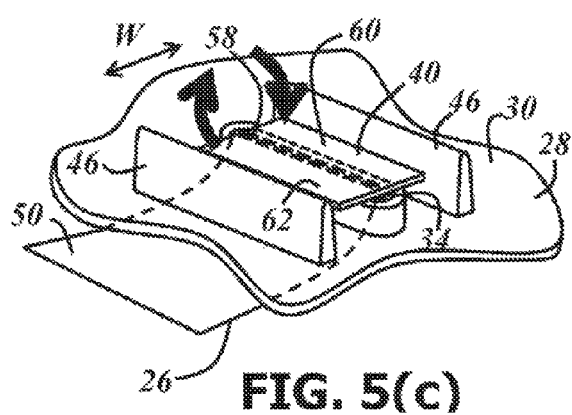

Operation of the hinge joint 58 during assembly is illustrated in FIGS. 5(a)-5(c), which depict the exemplary inner side 30 of the frame member 28. In this example, the attachment opening 34 is a fully enclosed slot that extends between the outer side 32 of the frame member 28 to the shoulder 44 at the inner side 30 of the frame member 28. The shoulder 44 completely circumscribes the attachment opening 34 in this example, which may be preferred to distribute the load applied to the attachment tab 40 during the airbag deployment over a relatively large area.

In some embodiments, the shoulder 44 only partially circumscribes the attachment opening 34 and/or there is more than one shoulder engaged by the attachment tab 40. Here again, the attachment tab 40 is a generally flat piece of material sized to fit through the attachment opening 34.

In FIG. 5(a), the attachment tab 40 is shown passing through the attachment opening 34, during which time there is some slack in the concentrator material 50. A first end 60 of the attachment tab 40 is the first portion of the attachment tab 40 to pass through the attachment opening 34.

Where it is desired that the concentrator material 50 be placed in tension, or at least with minimal or no slack in the material when the concentrator strap 26 is attached to the frame member 28, the concentrator material 50 is sized so that the hinge joint 58 cannot extend past the inner side 30 of the frame member 28, which in this case is the shoulder 44. The concentrator material 50 may be sized so that the hinge joint 58 does not fully reach the inner side 30 of the frame member 28 to increase the amount of tension in the concentrator material 50.

As shown in FIG. 5(b), the attachment tab 40 is then tilted or rotated from the orientation of FIG. 5(a), and may be pushed to one side of the attachment opening 34 as shown so that a second end 62 of the attachment tab 40, opposite to the first end 60, can be passed through the attachment opening 34.

As shown in FIG. 5(c), the attachment tab 40 is then further pivoted about the hinge joint 58 to engage the inner side 30 of the frame member 28, thereby tightening or removing the slack from the concentrator material 50 and closing off a majority of the attachment opening 34.

Locators 46 are in the form of ribs or bosses extending from the frame member 28 at the inner side 30 in this example. The locators 46 are advantageously situated to limit the widthwise (W) movement of the attachment tab 40 once it is engaged at the inner side 30 of the frame member 28.

This particular configuration, where a generally flat attachment tab 40 is passed through the attachment opening 34 and rotated about the hinge joint 58 by about 90 degrees to engage the inner side 30 of the frame member 28, may be referred to as a "butterfly" clip and offers several advantages over other types of clips.

For instance, a J-clip or hook-type attachment feature often requires excess concentrator material to be installed. With such hook-type attachments, up to 5-10 mm of excess material is sometimes necessary to allow the hook to extend sufficiently beyond the flange or other frame feature to which it is to be attached, since the concentrator material cannot be stretched. This can result in slack in the concentrator fabric in the assembled seat which, as noted above, can lead to slower tear seam function and/or read-through of the concentrator material at the visible surface of the seat cover where the excess material wrinkles rather than lying flat or conforming to the shape of the surrounding materials.

Pocket-style concentrator elements, where the airbag module is surrounded on all sides and the bottom by concentrator material, often require up to 30 mm of excess concentrator material to allow the airbag module to easily slip into the pocket during assembly.

A generally flat attachment tab 40 may also be simpler and less expensive to manufacture than an attachment clip with one or more bends. For instance, flat attachment tabs can be die cut from plastic sheet stock at high rates of speed with low associated tooling cost. The illustrated configuration is also a more robust attachment than a hook clip, as it is not easily or accidentally detached. Heavy and bulky metal brackets are also not required, as may be the case in bolt-on types of concentrator elements. Skilled artisans will recognize other advantages.

Certain dimensional relationships may be useful or necessary, such as the relationship between the width of the attachment opening 34 and the width of the attachment tab 40. In embodiments in which the hinge joint 58 is formed midway between the first end 60 and the second end 62 of the attachment tab 40 as shown, the width of the attachment opening 34 should be at least half the width of the attachment tab 40 to allow the attachment tab 40 to be reoriented at the inner side 30 of the frame member 28 as shown. The minimum required width of the attachment opening 34 may be more or less, depending on the distance between the hinge joint 58 and the second end 62 of the attachment tab 40. The width of the attachment tab 40 should be greater than the width of the attachment opening 34 to ensure retention of the attachment tab 40 at the inner side 30 of the frame member 28.

In one embodiment, the distance (H) from the shoulder 44 to the surrounding portion of the inner side 30 of the frame member 28 (as shown in FIG. 5(a)) is one half of the width of the attachment tab 40.

Figure 6:
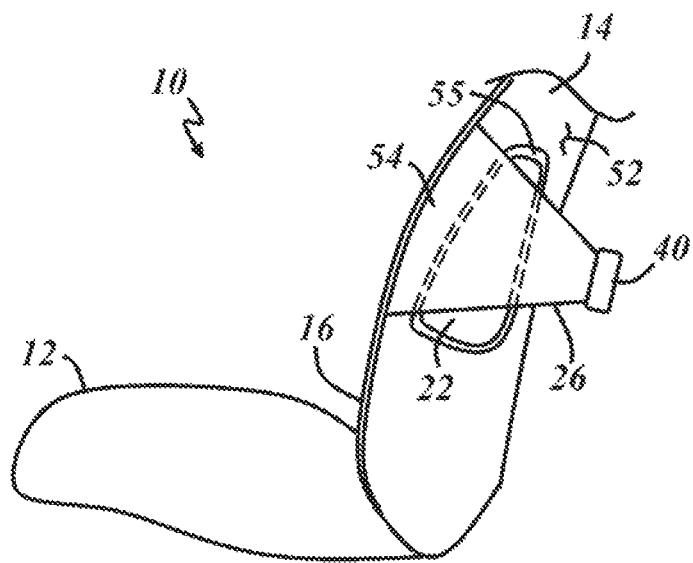
FIG. 6 is a side view of the outboard side of another example of the vehicle seat, including a foam cushion with an airbag module opening, where the concentrator strap extends over the airbag module opening.
Figure 7:
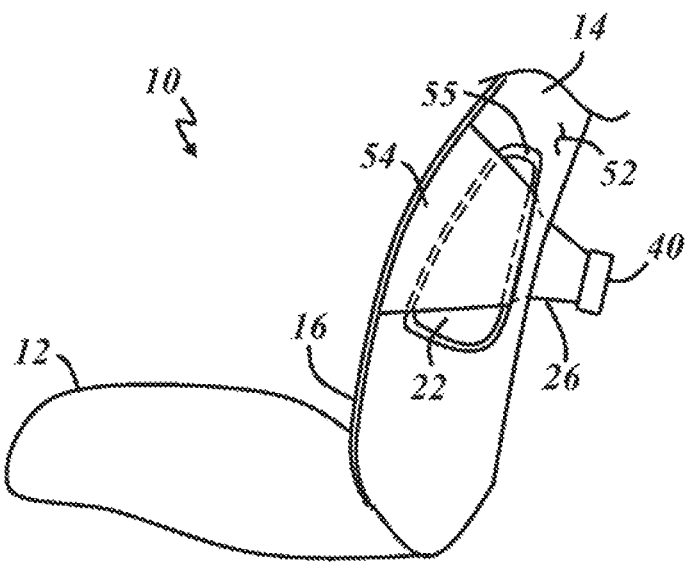
FIG. 7 is the side view of FIG. 6, showing the concentrator strap extending between the airbag module and the foam cushion.

FIGS. 6 and 7 illustrate another example of the vehicle seat 10 equipped with the concentrator strap 26, where a side portion of the seat cover 16 is omitted from the figures to show some of the underlying components. In this example, a portion of the foam cushion 52 between the seat frame 20 and the seat cover 16 includes an airbag module opening 55, and the airbag module 22 is located in the airbag module opening 55 so that the foam cushion 52 at least partially surrounds the airbag module 22. Here, the concentrator strap 26, in particular the second end 54 of the concentrator strap 26, extends over and along the foam cushion 52 and over and along the airbag module 22. In this configuration, the concentrator strap 26 can extend over the airbag module 22 and span the airbag module opening 55, as shown for example in FIG. 6, so that the concentrator strap extends over and along the foam cushion 52 on both sides of the airbag module 22 to be received by the attachment opening 34. Alternatively, the concentrator strap 26 can extend over and along the airbag module 22 and between the airbag module 22 and the foam cushion 52, as shown for example in FIG. 7, where the concentrator strap 26 is routed through the airbag module opening 55 to be received by the attachment opening 34.

As described in further detail below, the disclosed concentrator strap 26 facilitates a seat assembly process in which the airbag module 22 is attached to the seat frame 20 before the seat cover 16 is disposed over the seat frame 20. Oftentimes, where the concentrator material 50 in the form of dual straps or pocket-style concentrator components is used around the airbag module 22, the airbag module 22 cannot be attached to the seat frame 20 until after the seat cover 16 is already at least partially installed over the seat frame 20 because a portion of the concentrator material 50 must be routed beneath the airbag module 22, between the seat frame 20 and the airbag module 22. Attachments elements such as fasteners and electrical wiring have to be routed through the concentrator material 50 during such assembly.

The single-sided concentrator strap 26 described herein does not require that the airbag module 22 be assembled after the seat cover 16 and accompanying concentrator material 50 are present, greatly simplifying seat assembly.

Figure 8A:
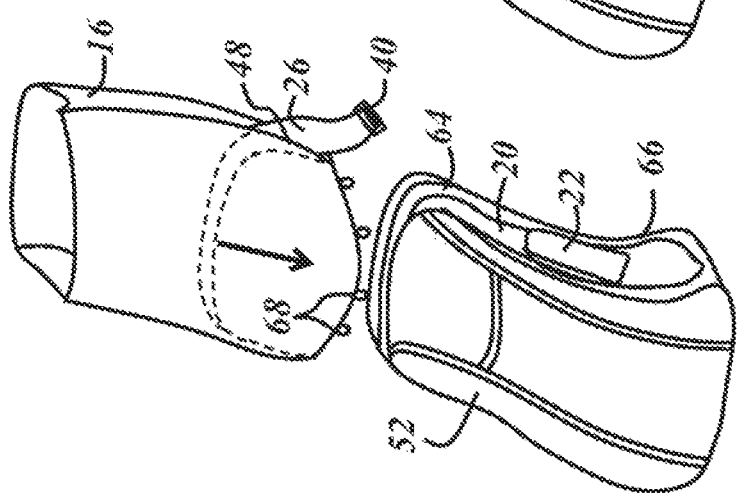
FIGS. 8(a)-8(c) illustrate an exemplary assembly process for a vehicle seat that includes the concentrator strap.
Figure 8B:
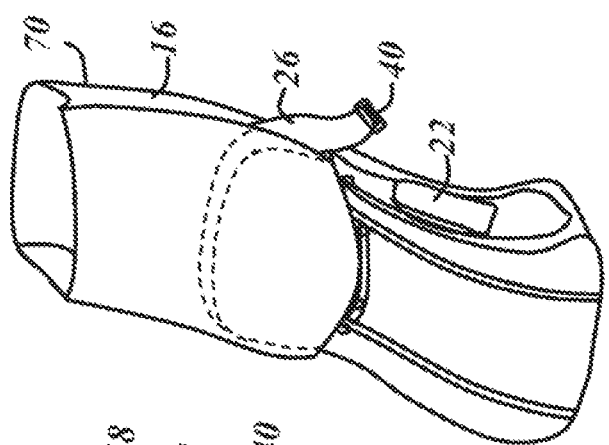
Figure 8C:
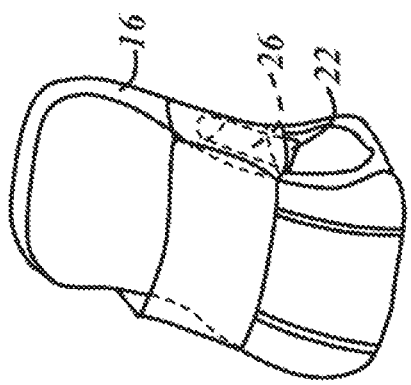

An example of a seat assembly process employing the single-sided concentrator strap 26 is illustrated in FIGS. 8(a)-8(c). As shown in FIG. 8(a), the airbag module 22 is first attached to the seat frame 20, along with the foam cushion 52.

As shown in FIG. 8(b), the seat cover 16, inverted (i.e., inside-out), is capped over and rolled down to cover a top portion 64 of the seat frame 20 and cushion, and a lower portion 66 of the seat frame 20 and cushion remains uncovered by the seat cover 16.

The seat cover 16 is equipped with the concentrator strap 26, as described by way of example above, which is attached to the seat cover 16 at the tear seam 48.

As shown in FIGS. 8(a)-8(b), the concentrator strap 26 is at the outside of the seat cover 16 since the seat cover 16 is inverted in the figures. In this example, attachment features 68 are used to attach the seat cover 16 to the frame and/or cushion.

As shown in FIG. 8(c) the seat cover 16 is then rolled further down over the seat frame 20 and at least a portion of the airbag module 22. The attachment tab 40 can then be grasped by an assembly operator or equipment and inserted through the attachment opening 34 formed in the seat frame 20 to engage the inner side 30 of the associated frame member 28.

In this particular example, the seat cover 16 is an envelope cover, which is a term of art meaning that the final vertical seams are already formed in the seat cover before being disposed over the seat frame 20—i.e. the seat cover 16 does not have a zipper, hook-and-loop fasteners, or other closures that need to be closed after the seat cover 16 is fully in place. In this case, the assembly operator can reach beneath the seat cover 16 to guide the attachment tab 40 into and through the attachment opening 34.

The simplicity and ease of assembly of the above-described butterfly clip, for example, allows for this type of blind assembly and attachment of the concentrator strap 26 since no access is necessary to the inner side 30 of the frame member 28 to route electrical wiring or to tighten mechanical fasteners, as the airbag module 22 is already attached to the seat frame 20. Of course, it is possible to incorporate a zipper or other final closure element along a seam or edge, such as a rear edge 70 of the seat cover 16, while still realizing many of the advantages of the described concentrator strap 26.

While described in the context of a seat back-mounted airbag, the above-described concentrator strap can be employed as part of the seat bottom in addition to or instead of the seat back, with the relevant orientation-specific language (e.g., top, bottom, vertical, etc.) modified to apply to the generally horizontal seat bottom (e.g., front, rear, horizontal, etc.).

Further, while the exemplary attachment tabs shown in the figures are all in the form of generally flat, rectangular tabs inserted through a slot-shaped attachment opening, other forms are possible. For instance, the attachment tab can have any shape (e.g., rod-shaped, disc-shaped, etc.), and the attachment slot can have any shape (e.g., round, rectangular, polygonal, etc.) where the tab and slot are relatively dimensioned so that the tab can be inserted through the attachment opening and reoriented at the opposite side of the opening to engage the inner side of the frame member while spanning a portion of the opening.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A vehicle seat, comprising:
   a seat frame that includes a frame member having an inner side, an opposite outer side, and an attachment opening extending between the inner side and the outer side;
   a seat cover disposed over the seat frame;
   an airbag module having an inflatable airbag located between the seat frame and the seat cover; and
   a concentrator strap extending between the airbag module and the seat cover, the concentrator strap having an end that extends into the attachment opening and an attachment tab at said end that engages the inner side of the frame member at the attachment opening so that the attachment tab bears against the inner side of the frame member on opposite sides of the attachment opening.

2. A vehicle seat as defined in claim 1, wherein the seat cover includes a tear seam and the concentrator strap has a second end attached to the seat cover at the tear seam.

3. A vehicle seat as defined in claim 1, wherein the concentrator strap further comprises a layer of concentrator material coupled with the attachment tab at a hinge joint.

4. A vehicle seat as defined in claim 3, wherein the attachment tab includes a face that engages the inner side of the frame member, the hinge joint being located along the face of the attachment tab.

5. A vehicle seat as defined in claim 3, wherein the concentrator material and the attachment tab are sewn together to form the hinge joint.

6. A vehicle seat as defined in claim 3, wherein the layer of concentrator material is in tension.

7. A vehicle seat as defined in claim 1, wherein the attachment opening is a fully enclosed slot.

8. A vehicle seat as defined in claim 1, wherein the frame member includes a shoulder at least partially circumscribing the attachment opening at the inner side, and the attachment tab engages the shoulder.

9. A vehicle seat as defined in claim 1, wherein each of the attachment opening and the attachment tab has a width measured in the same direction, the width of the attachment tab being greater than the width of the attachment opening.

10. A vehicle seat as defined in claim 1, wherein the frame member includes at least one tab locator extending from and arranged along the inner side of the frame member to restrict movement of the attachment tab in a widthwise direction.

11. A vehicle seat as defined in claim 1, further comprising a foam cushion located between the seat frame and the seat cover, wherein the concentrator strap does not extend along or through the foam cushion.

12. A vehicle seat as defined in claim 1, further comprising a foam cushion located between the seat frame and the seat cover, wherein the concentrator strap extends along or through the foam cushion.

13. A vehicle seat as defined in claim 1, further comprising a foam cushion at least partially surrounding the airbag module and located between the seat frame and the seat cover, wherein the concentrator strap extends between the airbag module and the foam cushion.

14. A vehicle seat as defined in claim 1, wherein the frame member is a seat back frame member.

15. A vehicle seat, comprising:
   a seat frame that includes a frame member having an inner side, an opposite outer side, and an attachment opening extending between the inner side and the outer side;
   a seat cover disposed over the seat frame;
   an airbag module having an inflatable airbag located between the seat frame and the seat cover; and
   a concentrator strap extending between the airbag module and the seat cover, the concentrator strap having an end that extends into the attachment opening and an attachment tab at said end that engages the inner side of the frame member at the attachment opening,
   wherein the frame member includes a shoulder at least partially circumscribing the attachment opening at the inner side, and the attachment tab engages the shoulder.

16. A vehicle seat as defined in claim 15, wherein the seat cover includes a tear seam and the concentrator strap has a second end attached to the seat cover at the tear seam.

17. A vehicle seat as defined in claim 15, wherein the concentrator strap comprises a layer of concentrator material coupled with the attachment tab at a hinge joint located along a face of the attachment tab that engages the inner side of the frame member.

18. A vehicle seat as defined in claim 15, wherein the concentrator strap comprises a layer of concentrator material sewn to the attachment tab at a hinge joint.

19. A vehicle seat as defined in claim 15, wherein the frame member includes at least one tab locator extending from and arranged along the inner side of the frame member to restrict movement of the attachment tab in a widthwise direction.

20. A vehicle seat as defined in claim 15, further comprising a foam cushion located between the seat frame and the seat cover, wherein the concentrator strap extends along or through the foam cushion.

\* \* \* \* \*